United States Patent [19]

Lanquist et al.

[11] Patent Number: 5,355,408
[45] Date of Patent: Oct. 11, 1994

[54] NETWORK INTERFACE DEVICE WITH ENVIRONMENTALLY PROTECTED COMPARTMENT

[75] Inventors: Todd C. Lanquist, Watauga; Kevin L. Strause, Keller; Thomas A. Dellinger, North Richland Hills; John A. Keenum, Keller, all of Tex.

[73] Assignee: Siecor Corporation, Hickory, N.C.

[21] Appl. No.: 966,477

[22] Filed: Oct. 26, 1992

[51] Int. Cl.⁵ .............................. H04M 9/00
[52] U.S. Cl. ..................... 379/397; 379/399
[58] Field of Search .......... 379/397, 412, 27, 399

[56] References Cited

U.S. PATENT DOCUMENTS

| | | | |
|---|---|---|---|
| 3,584,106 | 6/1971 | Miller | 174/52 PE |
| 4,488,008 | 12/1984 | Dellinger et al. | 179/81 R |
| 4,562,311 | 12/1985 | Dola | 379/27 |
| 4,588,238 | 5/1986 | Mickelson et al. | 339/91 R |
| 4,600,261 | 7/1986 | Debbaut | 339/116 C |
| 4,647,725 | 3/1987 | Dellinger et al. | 329/29 |
| 4,741,032 | 4/1988 | Hampton | 379/399 |
| 4,749,359 | 6/1988 | White | 439/133 |
| 4,827,502 | 5/1989 | Suffi et al. | 379/331 |
| 4,932,051 | 6/1990 | Karan et al. | 379/399 |
| 5,018,192 | 5/1991 | Smith | 379/399 X |
| 5,195,125 | 3/1993 | Bliven et al. | 379/29 |

Primary Examiner—James L. Dwyer
Assistant Examiner—Creighton Smith
Attorney, Agent, or Firm—J. David Abernethy

[57] ABSTRACT

Disclosed is a network interface device having wire connections encased in a potting compound.

1 Claim, 5 Drawing Sheets

NETWORK INTERFACE DEVICE WITH ENVIRONMENTALLY PROTECTED COMPARTMENT

BACKGROUND OF THE INVENTION

The invention is a telephone network interface device. Telephone network interface devices were disclosed in U.S. Pat. Nos. 4,488,008, and 4,749,359. The philosophy behind the network interface device is that, in the age of separate ownership of premise wiring by subscriber, means are needed to indicate whether a systems fault is in the portion of the loop owned by the telephone company or other utility or the premise wiring owned by the subscriber. In putting the concept into practice, it has been customary in the industry to provide devices having means for connection with telephone company subscriber loop wiring, premise wiring, and line cord wiring connected to electrical jack plugs.

Since the function of the network interface device is to provide for such connections and to allow individual subscribers to test for faults by temporarily disconnecting their wiring from the telephone company subscriber loop, problems can arise when bare connections are exposed to moisture or other environmental conditions which may degrade performance of the unit.

SUMMARY OF THE INVENTION

The telephone network interface device according to the current invention provides improved protection from environmental hazards. The improved device includes a rack having a first side and a second side, the rack being perforated by at least one jack opening and a set of terminal openings, each jack opening and terminal opening in communication with the first and the second rack sides. A set of premise wiring terminals are each inserted into a terminal opening from the first rack side, and a set of line cord terminals are each inserted into a terminal opening from the second rack side to be in electrical communication with a premise wiring terminal. For each jack opening, an electrical jack is inserted therein. Each electrical jack has a plug receptacle facing the first rack side and a set of wire receptacles facing the second rack side. Telephone company subscriber loop wiring is inserted into the wire receptacles and a jack plug is inserted into the plug receptacle. A line cord electrically connects the jack plug and a pair of line cord terminals. A receptacle base is attached to the second side of the rack. After the modular components of the network interface device have been inserted and wiring connections have been completed, a potting compound is introduced into the receptacle base so as to harden and cover the set of line cord terminals and the set of wire receptacles. The potting compound protects the line cord terminals and the set of wire receptacles from environmental influences thereafter. The potting compound does not interfere with the function of the network inter-face device, since the individual subscriber requires access only to the electrical jack and jack plug for testing purposes.

The improved network interface device may be a single line device, having only one jack plug, or a multiple line device, having a plurality of electrical jacks and jack plugs. For clarity of understanding, the detailed description will describe a multi-line improved network interface device.

BRIEF DESCRIPTION OF THE DRAWINGS

The detailed description of the preferred embodiment is described with reference to the drawings, in which.

DETAILED DESCRIPTION OF THE PREFERRED EMBODIMENT

Figure 1:
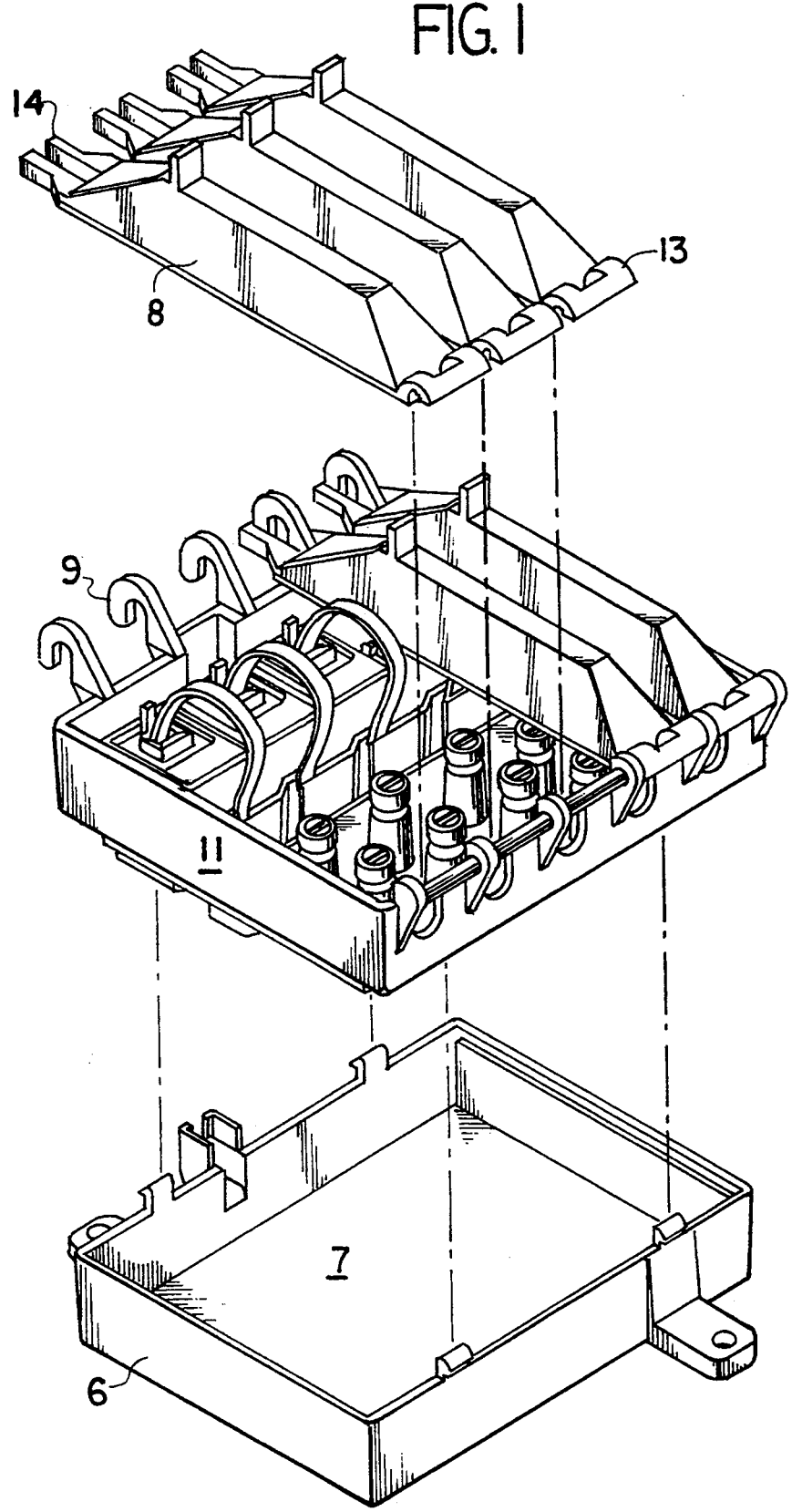
FIG. 1 is a perspective view of the base, rack, and doors.
Figure 3:
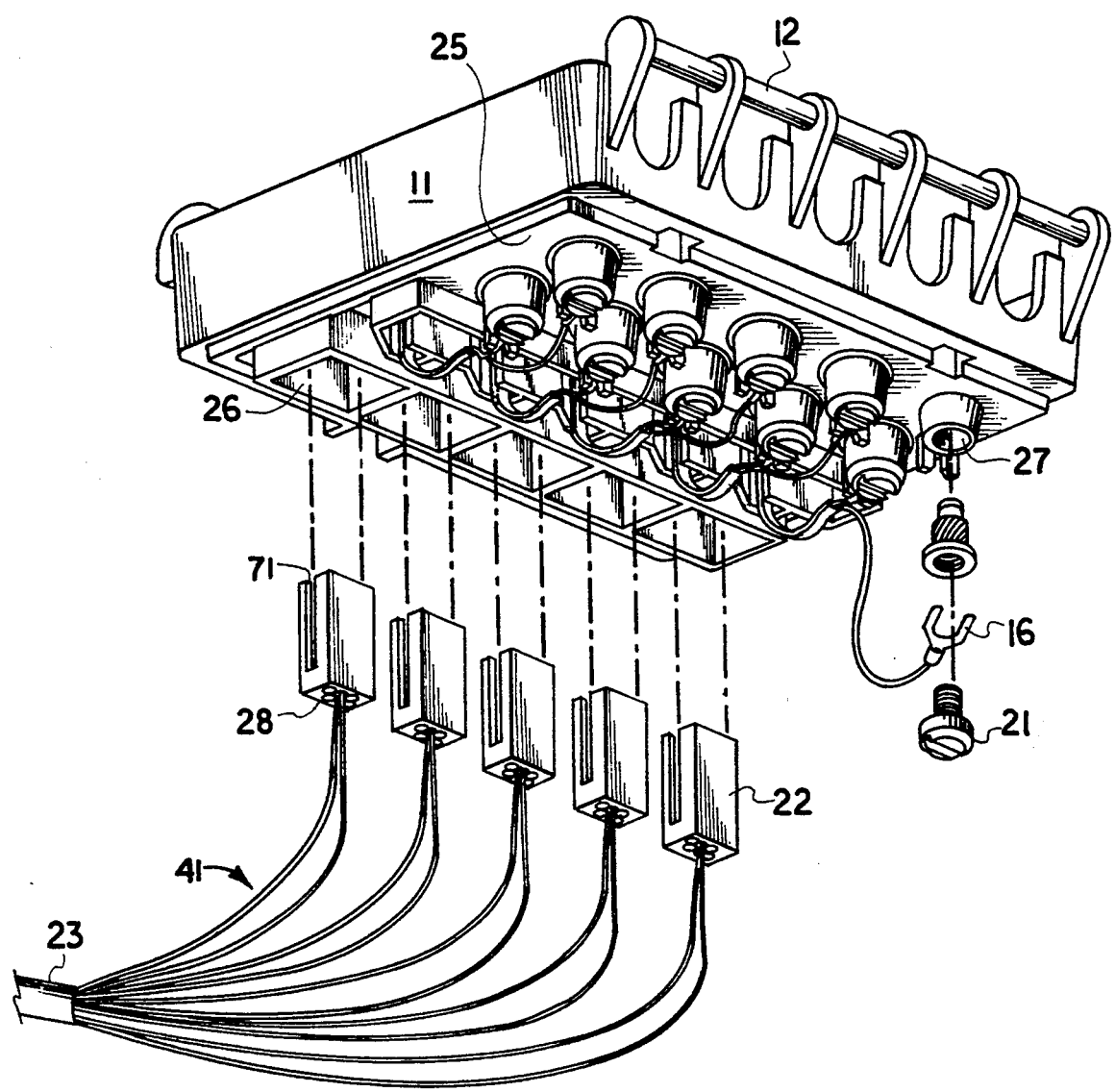
FIG. 3 is an expanded view of the second side of the rack.
Figure 4:
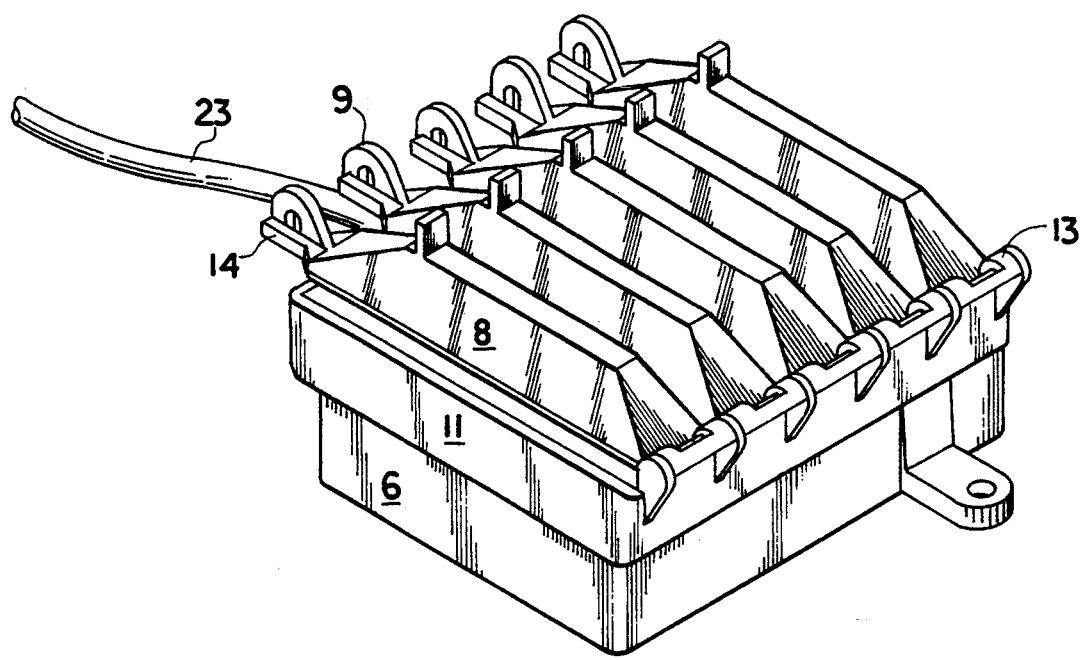
FIG. 4 is a perspective view of the assembled device.

Base 7, rack 11, and doors 8 of the improved network interface device are shown as separated in FIG. 1 for clear description. Receptacle base 7 has a bottom, four upstanding sidewalls 6, and a strain relief entrance, shown at the left rear of the receptacle base, for the telephone company subscriber loop cable 23. Receptacle base 7 also serves to hold potting compound 40 as will be described later. Rack 11 has hinge pins 12 and hooks 9. Doors 8 have hinges 13 and lock projections 14. To assemble these components, as shown in FIG. 4, the upstanding tabs shown on sidewalls 6 are pressed into corresponding openings on the bottom of rack 11; two such openings are visible in FIG. 3. After door hinges 13 are pressed onto hinge pins 12, separate subscriber locks may be placed as desired in the spaces under the arches formed by hooks 9, as shown in FIG. 4.

Figure 2:
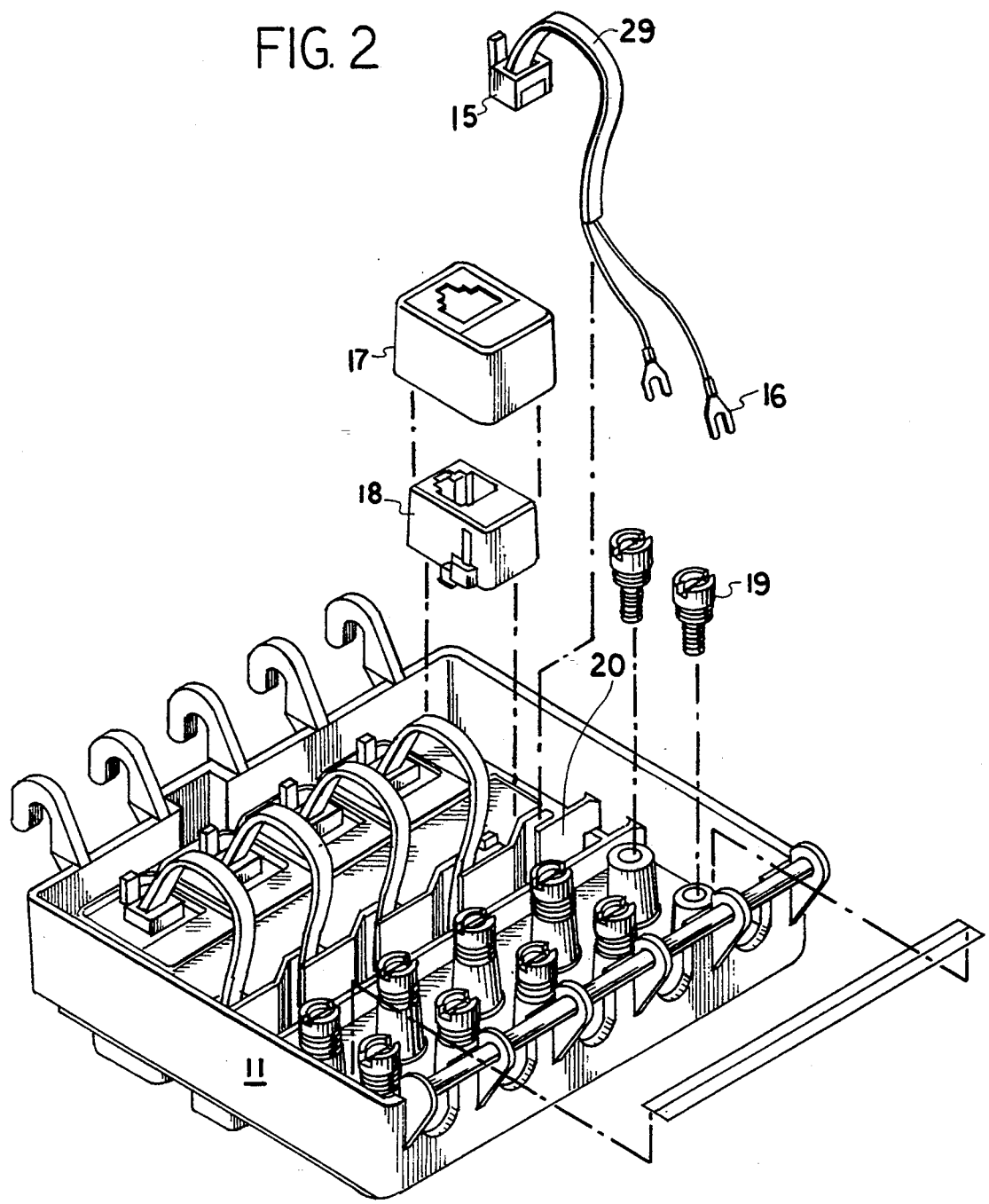
FIG. 2 is an expanded view of the first side of the rack.

The first side 24 of rack 11 is now discussed with reference to FIG. 2. Each jack plug 15 is connected to a jack plug receptacle 71 after passing through a protective entry gland 17 and a jack housing 18 to provide structural and environmental protection for the jack and plug connections. A line cord 29 having metal tips 16 thereon connects each jack plug 15 with a set of line cord terminals 21. A set of premise wiring terminals 19, one side for tip and the other for ring, are each inserted into a terminal opening 27 from first side 24. A colored strip is inserted to lie between the pairs of tip and ring terminals to help distinguish between the two. An opening 20 is provided for the insertion of a potting compound.

The second side 25 of rack 11 is discussed with reference to FIG. 3. A telephone company drop cable 23 proceeds into the network interface device through a strain relief opening provided between rack 11 and receptacle 7. Proceeding from drop cable 23 is a set of telephone company subscriber loop wiring 41, which are inserted into a set of wire receptacles 28 in one side of an electrical jack 22. Electrical jacks 22 are each inserted into a jack opening 26, with each electrical jack 22 having a plug receptacle 71 facing the first rack side 24 and a set of wire receptacles 28 facing the second rack side 25. Line cords 29 proceed from the first rack side to the second rack side with metal tips 16, each connected to line cord terminals 21. Each line cord terminal 21 is connected electrically by means of metal inserts through terminal openings 27 to premise wiring terminals 19. Each jack plug 15 is therefore connected electrically to premise wiring terminals 19, one each for tip and ring.

Figure 5:
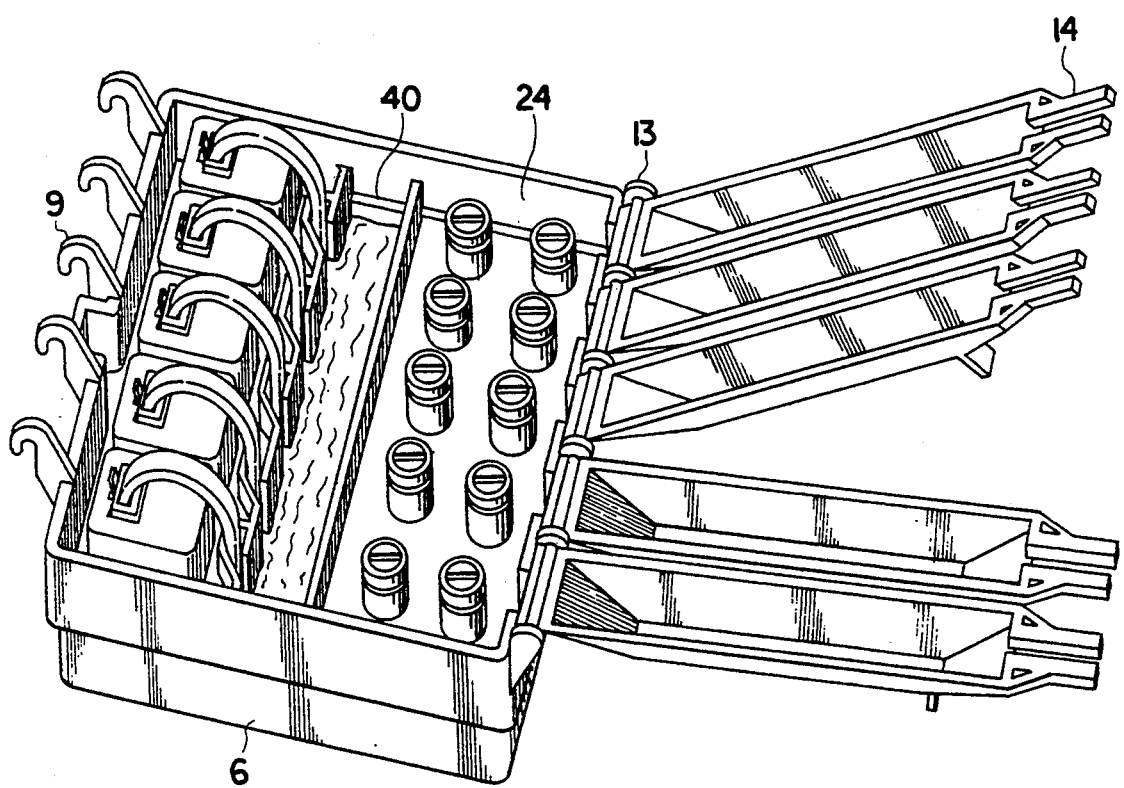
FIG. 5 is a perspective view of the assembled device with its doors opened.

After the assembly is complete, a potting compound 40 is poured through opening 20 in the rack to be collected in receptacle base 7 having upstanding sidewalls 6. Potting compound 40 is inserted to the level shown in FIG. 5 to cover line cord terminals 21 and wire receptacles 28.

The preferred embodiment is completely modular and can be designed to be a single line or multi-line device.

An alternative arrangement could have telephone company wiring 41 to terminate to screw towers connected by jumpers to jacks 22; however, the preferred embodiment eliminates the extra wire and hardware.

It will be noted that electrical jacks 22 are rather long to insure that wire receptacles 28 are totally submerged and to allow some leeway in the depth of potting compound 40.

Potting compound is introduced from the top of the unit (rack first side) rather than the bottom of the unit to reduce concerns with leaking of the potting compound into the first rack side 24.

While receptacle base 7 could be filled with potting compound 40 and then snapped to rack 11, wire volume would have to be calculated to arrive at the correct level of potting compound. Inserting the potting compound first would also be messier during manufacturing.

What is claimed is:

1. A telephone network interface device for connection between telephone company owned subscriber loop wiring and telephone subscriber owned premise wiring, comprising:
   (a) a rack having a first side and a second side, said rack perforated by at least one jack opening and a set of terminal openings, each such opening in communication with the first and second rack sides;
   (b) a set of premise wiring terminals each inserted into a terminal opening from the first rack side, and a set of line cord terminals each inserted into a terminal opening from the second rack side to be in electrical communication with a premise wiring terminal;
   (c) at least one electrical jack inserted into a jack opening, each jack having a plug receptacle facing the first rack side and a set of wire receptacles facing the second rack side;
   (d) a set of telephone company subscriber loop wiring inserted into a set of wire receptacle; and at least one jack plug, each jack plug inserted into a plug receptacle;
   (e) at least one line cord, each line cord in electrical communication between a jack plug and a pair of line cord terminals; and,
   (f) a receptacle base attached to the second side of the rack, said base holding a potting compound covering the set of line cord terminals and the set of wire receptacles, but not covering the set of premise wiring terminals.

* * * * *